US007143992B2

(12) United States Patent
Sassone et al.

(10) Patent No.: US 7,143,992 B2
(45) Date of Patent: Dec. 5, 2006

(54) DEVICE FOR REGULATING THE FLOW OF A FLUID, IN PARTICULAR FOR SOLENOID VALVES

(75) Inventors: Luigi Sassone, Casale Monferrato (IT); Paolo Savini, Casale Popolo (IT)

(73) Assignee: Eltek S.p.A., Monferrato (IT)

( * ) Notice: Subject to any disclaimer, the term of this patent is extended or adjusted under 35 U.S.C. 154(b) by 45 days.

(21) Appl. No.: 10/498,996

(22) PCT Filed: Dec. 13, 2002

(86) PCT No.: PCT/IB02/05376

§ 371 (c)(1),
(2), (4) Date: Jun. 18, 2004

(87) PCT Pub. No.: WO03/054436

PCT Pub. Date: Jul. 3, 2003

(65) Prior Publication Data

US 2005/0082504 A1    Apr. 21, 2005

(30) Foreign Application Priority Data

Dec. 21, 2001 (IT) .......................... TO2001A1206

(51) Int. Cl.
*F16K 47/00*    (2006.01)
*F16L 55/02*    (2006.01)

(52) U.S. Cl. .................. 251/127; 251/30.03; 251/118
(58) Field of Classification Search ............. 251/118, 251/120, 127, 129.15; 137/504, 544; 210/349, 210/418, 429–432, 435, 446, 447; 181/233, 181/234; 138/40, 44–46

See application file for complete search history.

(56) References Cited

U.S. PATENT DOCUMENTS

| 2,489,542 | A | * | 11/1949 | Rosenblum ............... 138/45 |
| 4,105,721 | A | | 8/1978 | Schliebe |
| 4,248,270 | A | * | 2/1981 | Ostrowski ............... 138/45 |
| 5,070,909 | A | | 12/1991 | Davenport |
| 5,487,528 | A | * | 1/1996 | Richmond ............... 251/127 |
| 5,813,500 | A | | 9/1998 | Deferme |
| 5,813,652 | A | * | 9/1998 | Richmond et al. ......... 251/127 |

FOREIGN PATENT DOCUMENTS

| EP | 0 356 057 A | | 2/1990 |
| EP | 0356057 A | * | 2/1990 |
| JP | 56 035832 A | | 4/1981 |
| JP | 09 014 460 A | | 1/1997 |

* cited by examiner

*Primary Examiner*—Edward K. Look
*Assistant Examiner*—John K. Fristoe, Jr.
(74) *Attorney, Agent, or Firm*—Sughrue Mion, PLLC

(57) ABSTRACT

A device (RF) for regulating and/or stabilizing the flow of a fluid comprises a single body (20), envisaged for insertion in a pipe for passage of the fluid, in particular the inlet pipe of a solenoid valve (1). According to the invention, in the single body (20) of the device there is directly integrated an arrangement for silencing the flow of the fluid. The single body (20) is made in a single piece of moulded thermoplastic material.

36 Claims, 5 Drawing Sheets

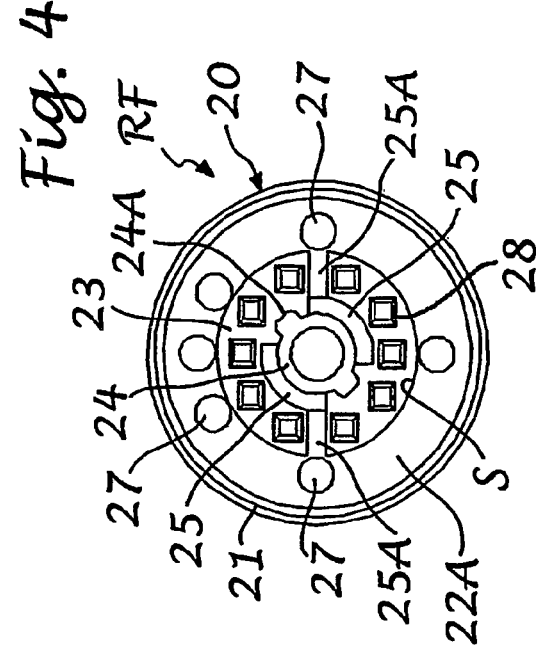

DEVICE FOR REGULATING THE FLOW OF A FLUID, IN PARTICULAR FOR SOLENOID VALVES

FIELD OF THE INVENTION

The present invention relates to a device for regulating the flow of a fluid, in particular for solenoid valves.

In the sector of electrical household appliances, as well as in other applications, there is a widespread use of devices aimed at regulating and stabilizing the flow of a liquid, known generically by the name of flow regulators.

Known flow regulators usually comprise a cylindrical body made of plastic material, which defines an axial passage for the liquid, and supporting means, set at one end of said passage, for supporting an elastically deformable membrane. Said membrane, when subjected to the action of the flow, undergoes deformation in a pre-defined way so as to regulate the passage of the liquid and the corresponding flow rate.

The body of the flow regulator is usually positioned within the inlet connection of a solenoid valve during fabrication of the latter.

The presence of the flow regulator is often the cause of a troublesome noise, which is noticed during passage of the flow of the liquid, following upon opening of the solenoid valve. In order to limit said drawback, there have thus been proposed purposely built silencing inserts, designed to be mounted in said inlet connection, between the flow regulator and the system for opening/closing the solenoid valve.

A typical example of functional combination between a flow regulator and a silencing insert is described in EP-B-0 356 057, to which the reader is referred also for a more detailed discussion of the problems linked to the noise induced by flow regulators, as well as for possible technical solutions to said problem.

The arrangement according to the known art proves costly, both because the flow regulator and the corresponding silencing insert are components that have to be produced separately and because, in the subsequent assembly step, there have to be envisaged two distinct operating steps for assembly of each of the two components.

DESCRIPTION OF THE RELATED ART

The regulator and the insert are typically held in position just by interference with the internal surface of the pipe which houses them. The relative positioning of the two components can occasionally be modified by the flow and/or by pressure jumps, with possible alteration of their pre-defined functional characteristics.

OBJECTS AND SUMMARY OF THE INVENTION

The purpose of the present invention is to overcome the aforesaid drawbacks by means of a new flow-regulator device of simple construction, reliable operation, and above all contained cost both in terms of production and in terms of assembly.

The above and yet other purposes are achieved, according to the present invention, by a device for regulating the flow of a fluid.

BRIEF DESCRIPTION OF THE DRAWINGS

Further purposes, characteristics and advantages of the present invention will emerge clearly from the ensuing detailed description and from the annexed drawings, which are provided purely by way of explanatory and non-limiting example and in which:

FIG. 2 is a top plan view of a flow regulator according to the invention;

FIG. 3 is a cross-sectional view according to the line III—III of FIG. 2;

FIG. 4 is a plan view similar to that of FIG. 2, but in which the flow regulator according to the invention is without one of its functional elements;

FIG. 5 is a plan view from beneath of a flow regulator according to the invention;

DESCRIPTION OF PREFERRED EMBODIMENTS OF THE INVENTION

Figure 1:
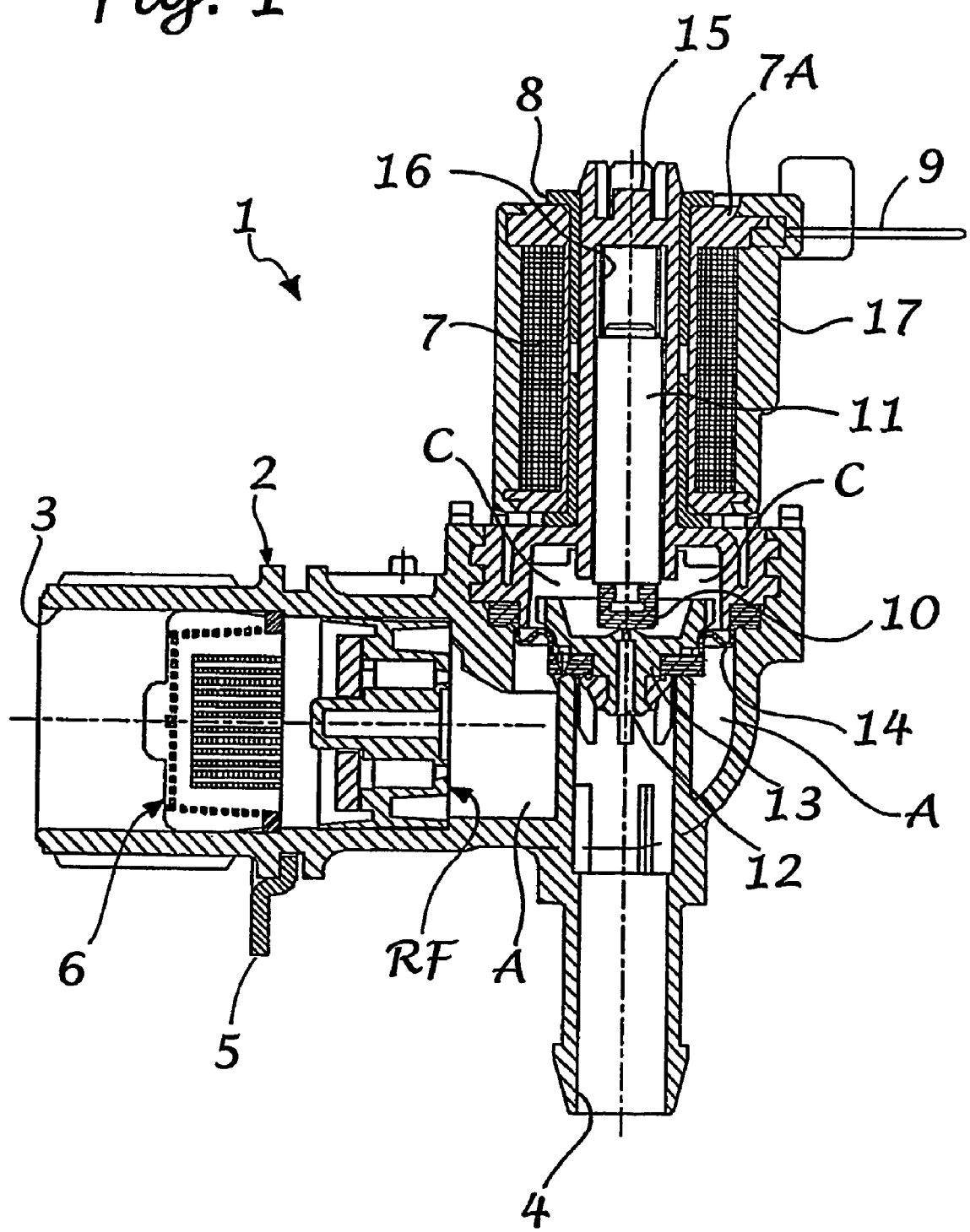
FIG. 1 is a lateral cross section of a solenoid valve equipped with a flow regulator according to the present invention.
Figure 6:
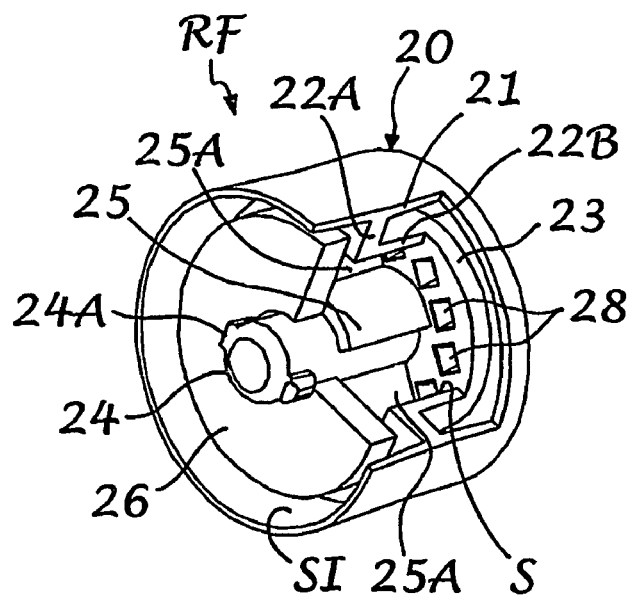
FIGS. 6 and 7 are two partially sectioned perspective views of the flow regulator of FIGS. 2 to 5.
Figure 7:
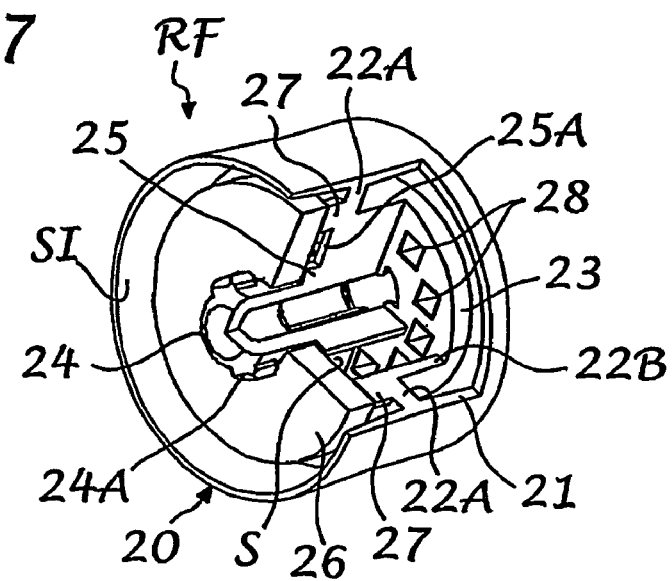
Figure 8:
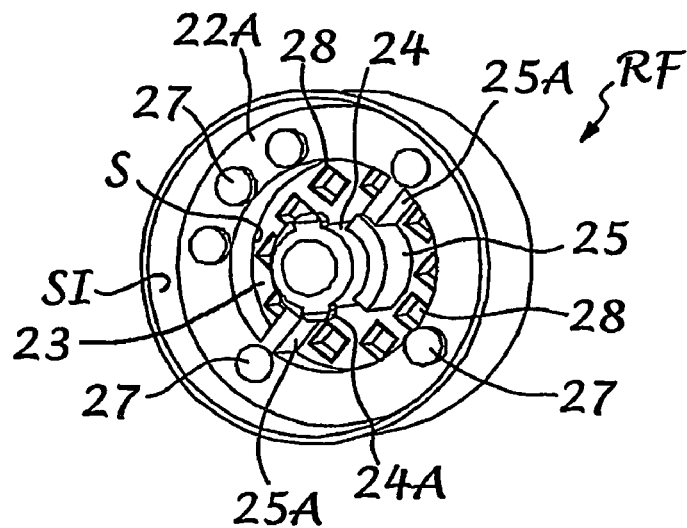
FIG. 8 is a perspective view of the flow regulator of FIGS. 2 to 5, but without one of its functional elements.

In FIG. 1, the reference number 1 designates, as a whole, a solenoid valve of the unbalancing type, or of the type servo-assisted by the pressure of the liquid, which integrates a flow-regulator device built according to the present invention. It may be assumed, by way of non-limiting example, that the solenoid valve 1 will be used for controlling the delivery of water to a generic washing machine for domestic purposes.

The solenoid valve 1 has a main body 2 comprising an inlet pipe 3, which can be connected by means of a pipe (not illustrated) to a tap of the water mains, and an outlet pipe 4, which can be connected to the washing machine. Associated to the body 2 is a flange 5, for fixing to the washing machine.

Within the inlet pipe 3 is housed a flow regulator built according to the invention, designated, as a whole, by RF. Said regulator RF is set downstream of a filter 6 of a type in itself known.

The solenoid valve 1 comprises a solenoid 7 made up of an induction coil consisting of an electrically conductive wire wound on a hollow bobbin 7A and provided with a magnetic yoke 8. The ends of the induction coil are electrically connected to two supply terminals, one of which is visible in FIG. 1 and is designated by 9.

The reference number 10 designates a first open/close element or plug inserted in one end of a mobile core 11 of the solenoid 7. The number 12 designates a passage or central hole present in a support or cup 13, which is integral with a second open/close element or membrane 14, the latter being constrained along its outer diameter between the body 2 of the solenoid valve 1 and an element 15 in which the mobile core 11 is positioned. When the solenoid 7 is not supplied at its electrical terminals 9, the plug 10, by means of the mobile core 11, is held by a spring 16 in the position for closing the hole or central passage 12.

The membrane 14 has calibrated holes, which, in combination with a respective passage made in the cup 13, are designed to set in communication an area A of the pipe 3 extending between the regulator RF and the membrane 14 with a chamber C delimited between the membrane 14 and the element 15. The aforementioned calibrated holes of the membrane 14 and the aforesaid pipes of the cup 13 are not shown in the figure.

The aforesaid hole or passage 12 made in the cup 13 enables, instead, the area A to be set in communication with the outlet connector 4 when the mobile core 11 is operated by the solenoid 7 in order to create a reduction in the pressure inside the chamber C such as to enable actuation of the valve 1 into the opening condition under the thrust of the incoming fluid, in accordance with the prior art. It is to be noted that the aforesaid reduction in the pressure may occur by virtue of the fact that the cross section of the passage of the hole 12 is greater than the sum of the cross sections of the individual calibrated holes in the membrane 14. The solenoid 7 is enclosed within a protective coating 17 obtained by moulding of thermoplastic material and fitted on the element 15. The latter has a threaded part, which is screwed into a threaded open seat made in the body 2 of the solenoid valve 1.

The flow regulator RF is illustrated in various views in FIGS. 2 to 8. In this connection, it is to be noted that in FIGS. 4 and 8 (as also in the subsequent FIGS. 9 to 14 and FIGS. 16 and 17) the said regulator is represented without its own membrane for regulating the flow (hereinafter designated by 26).

The flow regulator RF is of the variable-section type, which exploits deformation of an elastically deformable membrane, which is subjected to the action of the flow for self-regulation of passage of the liquid. According to the main aspect of the present invention, the body itself of the regulator RF is shaped for silencing the flow of the liquid that passes.

In the non-limiting example of FIGS. 2 to 8, the flow regulator RF has a body 20 with a substantially cylindrical outer wall, designated by 21. From an intermediate area of the wall 21 there branches off, towards the inside of the body 20, an annular wall, designated by 22A, which extends substantially at right angles to the cylindrical wall 21. From the internal end of the annular wall 22A, there then branches off a tubular wall 22B, which extends towards the bottom end of the body 20, basically at right angles to the annular wall 22A.

As may be appreciated from FIG. 3, in the embodiment provided by way of example, the internal diameter of the outer wall 21 decreases progressively from the top end of the body 20 up to the annular wall 22A. Instead, the internal diameter of the outer wall 21 increases progressively from the annular wall 22A up to the bottom end of the body 20.

The tubular wall 22B, which has an external diameter that decreases progressively, terminates in a bottom wall 23 of the body 20, which extends substantially parallel to the stretch of annular wall 22A.

From the bottom wall 23, there rises centrally a substantially circular second wall, which is designed to form a pin 24 having a substantially cylindrical shape and having an internal blind hole. From the bottom wall 23, along said circular wall or pin 24, there also rise two distinct supports 25. As may be noted (see, for instance FIGS. 4, 6 and 8), the supports 25 have a cross section shaped substantially like an arc of circumference and are formed in areas set opposite with reference to the pin 24.

As may be noted (see, in particular, FIGS. 4 and 6 to 8), between the side surface of each support 25 and the inner surface of the wall 21, there extends a respective baffle or radial diaphragm designated by 25A.

The reference number 26 designates an elastically deformable membrane having an annular shape, the central hole 26A of which is fitted on the pin 24. The membrane 26 is positioned so that the part of its bottom surface close to the central hole 26A is resting on the top surface of the supports 25. Maintenance of the position of the membrane 26 on the pin 24 is guaranteed by the presence of lateral retention appendages 24A defined on the end of the pin itself.

The reference number 27 designates projections or spacers having a circular cross section, which rise with calibrated height and distribution from the wall 22 to provide resting points for the part of the bottom surface of the membrane 26 close to the external diameter of the latter. In accordance with the known art, the projections 27 have the function of pre-determining the value of the flow rate of liquid at which the regulator RF intervenes.

Finally, the reference number 28 designates through holes of smaller cross section than that of the chamber S, i.e., the chamber which extends between 22B and 24–25. The holes 28 are defined in the area of the bottom wall 23 not occupied by the pin 24 and by the supports 25. According to the invention, the holes 28 preferably have a non-circular cross section, in particular a square cross section, as shown in the example provided in the figures, or a rectangular cross section. Furthermore, preferably, the cross section of the holes 28 is slightly flared at the ends thereof facing the inside of the chamber S, as may be noted, for instance, in FIGS. 3, 4 and 8. In the case of the embodiment illustrated in FIGS. 2 to 8, each of the two half-chambers defined by the diaphragms 25A is provided with an equal number of holes 28, namely five.

As may be noted, therefore, the body 20 of the regulator RF has:

a first inlet section, designated by SI in FIG. 3 formed by the top portion of the outer wall 21;

a narrowing or necking for passage and regulation of the liquid made by means of the annular part 22A, which projects towards the inside of the body 20;

a chamber, designated by S in FIG. 3 underlying the aforementioned narrowed part and having a section substantially the same as the latter, defined by the tubular wall 22A, the bottom 23, the pin 24, the supports 25, and the membrane 26; in the case provided by way of non-limiting example in FIGS. 2 to 8, the said chamber S is, in turn, divided into two half-chambers by means of diaphragms 25A; and a plurality of outlet ports of small cross section formed by the holes 28.

According to the invention, the body 20 of the flow regulator RF is entirely obtained from thermoplastic material by means of a simple operation of moulding by virtue of the fact that the configuration proposed for the body 20 does not present a complex shape and/or complex undercuts. In order to obtain the body 20 it is therefore possible to use moulds for thermoplastic material of simple structure and contained cost.

Operation of the device RF according to the invention, in combination with the solenoid valve 1 of FIG. 1 is described in what follows.

With the solenoid valve 1 closed, i.e., with the solenoid 7 not energized, the liquid present in the inlet pipe 3 and in the area A is at the pressure of the mains supply, which is greater than the pressure existing in the outlet pipe 4. The liquid in the pipe 3 may reach, by means of the aforementioned calibrated holes of the membrane 14, the chamber C. The pressure, which is greater in the chamber C than in the outlet pipe 4 maintains the membrane 14 and the cup 13 in the condition which closes the passage that sets the area A in communication with the outlet pipe 4.

In order to enable passage of the liquid, the solenoid valve 1, which is of the normally closed type, must be activated in opening by supplying the solenoid 7. For this purpose, the solenoid valve 1 is electrically connected to the washing machine governed by it, which, by means of a programmer of its own, sees to controlling at the right moment (for example, at the start of a washing step) supply of the solenoid 7 by means of the terminals 9.

When the solenoid 7 is supplied, the mobile core 11 is attracted, so opening the central hole 12 of the cup 13. This enables the liquid present in the chamber C to be brought to the same pressure as the one present in the outlet pipe 4 (which, as has been said, is at a pressure lower than the incoming liquid arriving from the pipe 3 and/or present in the area A), under the thrust of which the membrane 14 and the cup 13 move so as to open the passage between the area A and the outlet pipe 4.

In the course of its passage of from the inlet pipe 3 to the outlet pipe 4, the flow of the liquid is stabilized and regulated by means of the membrane 26 of the regulator, according to modalities in themselves known.

It may be noted that, on account of the presence of the membrane 26, the pressure of the liquid entering the pipe 3 remains greater than that of the liquid leaving the pipe 4. Furthermore, on account of the geometry of known flow regulators, on the corresponding outlet there are present high levels of turbulence. These are the chief causes of the noise that is heard following upon opening of the solenoid valve in the case where appropriate silencing means are not provided, as mentioned in the introductory part of the present description.

In the case of the present invention, the fact that the flow regulator RF integrates directly the chamber S immediately downstream of the membrane 26, together with the plurality of holes 28 of small cross section in the bottom 23, enables the liquid passing in the flow regulator itself to assume a pressure that is intermediate between the pressures present in the pipes 3 and 4 and/or the flows to be stabilized, thus making it possible to render passage of the flow silent.

In the case of the present invention, the membrane 26 is supported centrally by the pin 24, and hence the flow of liquid entering the flow regulator RF enters the chamber S in a radial way passing underneath the membrane itself from its outer edge. In greater detail, in the context of the flow of liquid passing inside the regulator RF, it is possible to identify a number of successive stretches, namely:

a first flow stretch, which is axial in the chamber SI;
a second flow stretch, which is radial from the outside towards the centre underneath the membrane 26; and a third flow stretch, which is axial in the chamber S, which is then divided, by means of the holes 28, into a number of partial axial flows, the said partial flows remaining substantially axial until they recombine in the area A of the pipe 3.

When, subsequently, the solenoid 7 is de-energized, the mobile core 11 returns into its original position so that the plug 10 will close the central hole 12 of the cup 13 again. In this condition, the chamber C returns to a pressure higher than the one present in the outlet pipe 4, so causing a movement of the membrane 14 and of the cup 13 into the position where the passage between the chamber A and the outlet pipe 4 is closed. There is thus a return to the initial conditions.

From the description provided above, as well as from the attached claims, which form an integral part thereof, the characteristics of the present invention emerge clearly, as do the corresponding advantages, namely:

the flow regulator RF according to the invention directly integrates a silencing arrangement and can be made of a single body, to which is associated the respective membrane, which may be obtained by means of a simple process of moulding of thermoplastic material at contained production costs;

the fact that the flow regulator according to the invention directly integrates silencing means rules out the need, which is typical in the known art, of having to provide a specific operation for assembly of a purposely built and distinct silencing insert;

the fact that the flow regulator according to the invention directly integrates the silencing means likewise prevents the risk, which is typical in the known art, that the said silencing means may change position or their distance apart from one another and hence cause variations in the operating characteristics.

It is clear that numerous variants are possible for the person skilled in the art to the device described by way of example, without thereby departing from the scope of the inventive idea.

Figure 9:
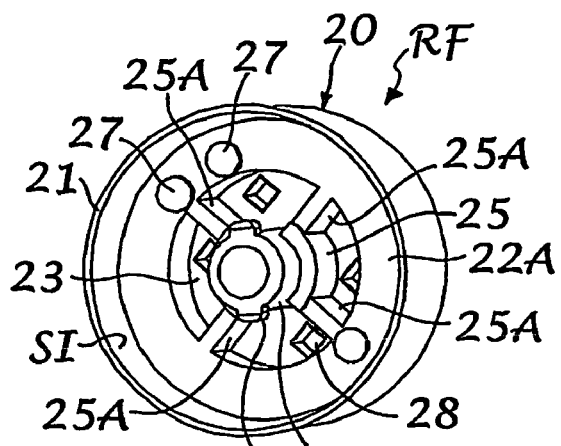
FIGS. 9, 10 and 11 are, respectively, a perspective view, a top plan view and a plan view from beneath of a flow regulator, without one of its functional elements, built according to a first possible variant embodiment of the invention.
Figure 10:
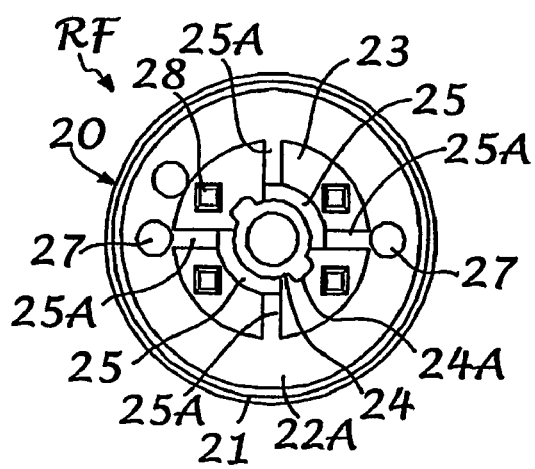
Figure 11:
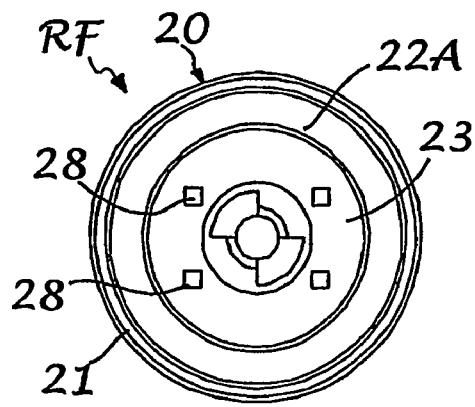

In the case of FIGS. 9 to 11, in which the references appearing in the foregoing figures are used to designate elements that are technically equivalent to the ones already described, there is for example represented a flow regulator RF, the body 20 of which is provided with four ribs or diaphragms 25A so that the chamber D will be divided into four half-chambers. In the case of the said variant, a single hole 28 is provided for each half-chamber.

Figure 12:
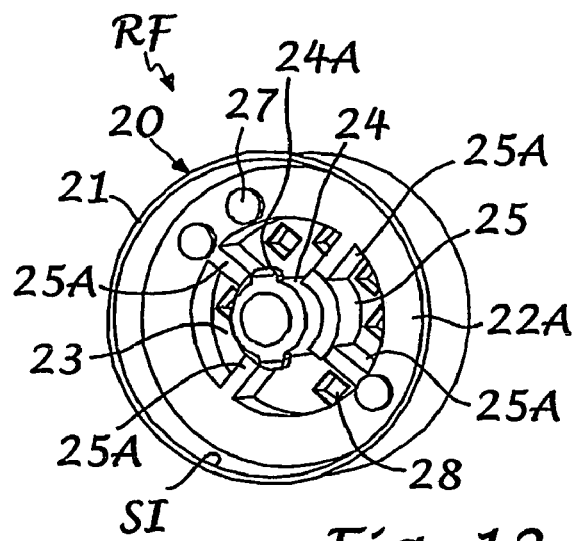
FIGS. 12, 13 and 14 are, respectively, a perspective view, a top plan view and a plan view from beneath of a flow regulator, without one of its functional elements, built according to a second possible variant embodiment of the invention.
Figure 13:
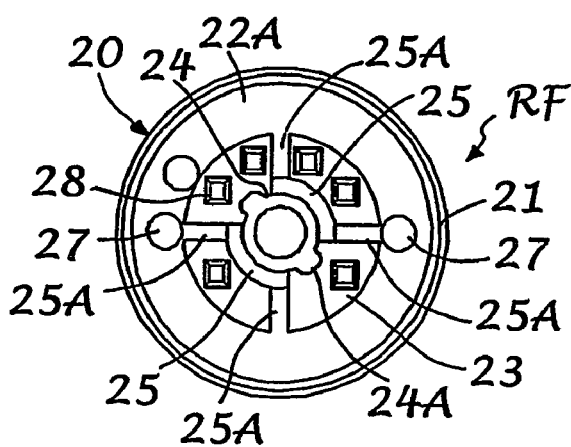
Figure 14:
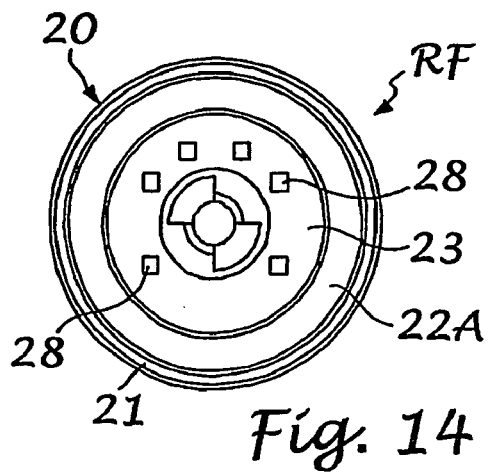

In the case of the variant illustrated in FIGS. 12 to 14, instead, even though there are once again provided four diaphragms 25A, a different distribution, i.e., non-specular distribution, of the holes 28 is envisaged. If need be, this arrangement may be provided in order to compensate for any possible distributions of the flow of the liquid in the regulator RF due to the different distributions of the calibration projections 27, which tend to keep the membrane 26 more raised and hence to concentrate the regulated flow in that area.

The diaphragms 25A, irrespective of their number, may be provided should the aim be to contain or prevent formation of any turbulent or circular flow inside the flow regulator RF. The said diaphragms may therefore advantageously operate as a preliminary diffusor and may be appropriately shaped for this purpose, as well as possibly contributing to the reinforcement of the central pin 24.

Figure 15:
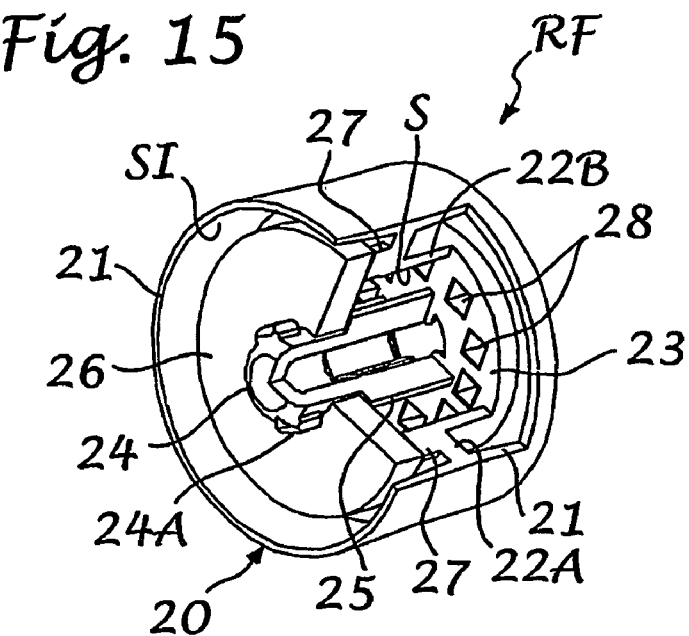
FIG. 15 is a partially sectioned perspective view of a flow regulator built according to a third possible variant embodiment of the invention.
Figure 16:
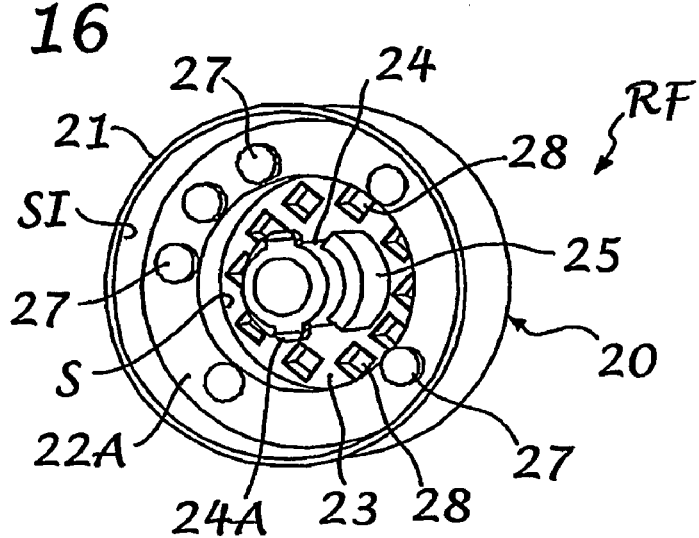
FIG. 16 is a perspective view of the flow regulator of FIG. 15 without one of its functional elements.
Figure 17:
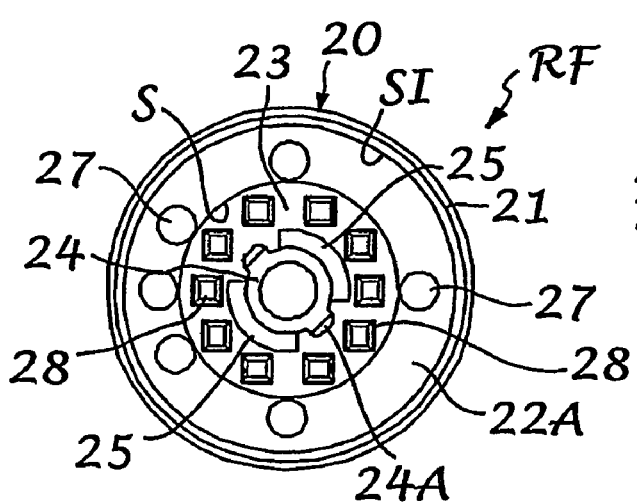
FIG. 17 is a top plan view of the flow regulator FIGS. 15 and 16.

It should however be noted that, in accordance with a further possible embodiment of the invention, an example of which is represented in FIGS. 15 to 17, the diaphragms 25A could be completely omitted, given that the pin 24 and the supports 25 are, in any case, supported by the bottom 23, which is, in turn, integral with or fixed to the internal tubular wall 22B, the latter being supported or fixed by means of the annular wall 22A directly by the external wall 21 of the body 20.

According to a further possible variant, the annular wall 22A could have a thickness that is decidedly greater than the one illustrated in the attached figures so that its central or internal hole may replace the annular wall 22B. In this variant, the bottom wall 23 would therefore be attached to the wall 22A or else to the outer wall 21.

In other possible variants of the invention, there could be provided radial ribs or diaphragms between the outer wall 21 and the inner tubular wall 22B and/or between the bottom wall 23 and the outer wall 21.

Instead of a disk membrane of the type designated previously by 26, the device RF according to the invention could envisage flow-regulating means of a different type, in accordance with techniques in themselves known, such as an O-ring or a mobile cup with a spring.

In accordance with a further possible variant, the flow regulator RF could be conceived for operating also as a filter. In this perspective, in order to prevent any possible early clogging thereof, there could be provided an adequate or greater number of holes 28 within the chamber S. The said holes will be appropriately sized, as regards their number and their location, by possibly providing some of them also on the wall 22B of the chamber S (which may be more elongated than what is shown in the case of the example provided previously), as well as on the bottom 23. In order to facilitate moulding of the said lateral holes on the wall 22B, the bottom part of the outer wall 21 could be absent or else modified with respect to what has been illustrated.

What is claimed is:

1. A device for regulating and stabilizing a flow of a fluid adapted for insertion in a pipe for passage of the fluid (3), said device (RF) comprising a single body (20) and an elastic flow regulating means (26), said single body (20) having at least:
    one inlet (SI), having a first section;
    a section narrowing (22A) downstream of said inlet (SI) and said flow-regulating means (26); and
    supporting means (24, 25), for supporting said flow-regulating means (26) upstream of said narrowing (22A);
    wherein said single body (20) further defines, downstream of said narrowing (22A) and said flow-regulating means (26), a chamber (S) having a cross section smaller than that of said inlet (SI), said chamber (S) having at the longitudinal end thereof opposite to said flow-regulating means (26), bottom wall (23),
    wherein a peripheral wall (21) of said single body (20) surrounds at least partly said flow-regulating means (26), at least a part of an outer edge peripheral of said flow-regulating means (26) being spaced apart from an inner surface of said peripheral wall (21), to define therebetween an inlet passage for the fluid,
    wherein said flow-regulating means (26) are at least partially spaced apart from said narrowing (22A), in an axial direction of said single body (20), to define therebetween a path connecting said inlet passage with said chamber (S), and
    wherein said chamber (S) is provided with a plurality of outlet passages (28) having a section smaller than that of said chamber (S).

2. The device according to claim 1, wherein a plurality of said outlet passages (28) is defined in said bottom wall (23), said outlet passages ((28) extending through said bottom wall (23).

3. The device according to claim 2, wherein at least one tubular wall of said single body (20) rises centrally from said bottom wall (23) within said chamber (S), said outlet passages (28) being defined in an area of said bottom wall (23) not occupied by said at least one tubular wall (24).

4. The device according to claim 1, wherein said supporting means (24, 25) comprise at least one pin element (24), which rises from said bottom wall (23) towards the inside of said single body (20), and said flow regulating means comprise a membrane (26) having a central hole (26A) into which a part of said pin element (24) is inserted.

5. The device according to claim 1, wherein said supporting means (24, 25) comprise at least one pin element (24), supported by said bottom wall (23), and said flow regulating means comprise a membrane (26) having a central hole (26A) into which a part of said pin element (24) is inserted.

6. The device according to claim 5, wherein part of a bottom surface of said membrane (26) near said central hole (26A) is locally resting upon a top surface of projections (25) which extends from said bottom wall (23) towards the inside of said single body (20).

7. The device according to claim 1, wherein said supporting means (24, 25) include a tubular pin element (24) which defines internally at least one blind hole.

8. The device according to claim 1, wherein said supporting means (24, 25) comprise one or more projections (25), which rise from said bottom wall (23) towards the inside of said chamber (S), where, at least one portion of said flow regulating means (26) rests on top of said projections (25).

9. The device according to claim 8, wherein said supporting means (24, 25) comprise at least one pin element (24), supported by said bottom wall (23) and said projections (25) are formed in opposite side areas of said pin element (24).

10. The device according to claim 1, wherein said outlet passages (28) are defined in lateral areas of said bottom wall (23), said supporting means (24, 25) rising from a central region of said bottom wall (23).

11. The device according to claim 1, wherein said outlet passages (28) have a non-circular cross section.

12. The device according to claim 1, wherein a cross section of said outlet passages (28) is flared at an end thereof facing the inside of said chamber (S).

13. The device according to claim 1, wherein said chamber (S) has at least one internal subdivision diaphragm (25A) for dividing said chamber (S) into at least two sub-chambers.

14. The device according to claim 1, wherein relieves or spacers (27) for said flow-regulating means (26) rise from one surface of said narrowing (22A).

15. The device according to claim 14, wherein said flow-regulating means comprise a membrane (26) and said relieves (27) constitute points of local support for at least one part of a bottom surface of said membrane (26) near an external diameter thereof.

16. The device according to claim 14, wherein a number of said outlet passages (28) is more concentrated in areas of said bottom wall (23) to which there correspond areas of said narrowing (22A) where said relieves (27) are defined.

17. The device according to claim 1, wherein an annular wall branches off from said peripheral wall (21), towards the inside of said single body (20), said annular wall defining said narrowing (22A) and extending in a direction substantially orthogonal to said peripheral wall (21).

18. The device according to claim 17, characterized in that from an internal end of said annular wall an inner tubular wall (22B) of said single body branches off, which extends towards an end of said body (20) opposite to an end of said body in which said flow-regulating means (26) are positioned.

19. The device according to claim 18, wherein said inner tubular wall (22B) is substantially orthogonal to said annular wall (22A).

20. The device according to claim 18, wherein said bottom wall (23) is provided at a bottom end of said inner tubular wall (22B).

21. The device according to claim 18, wherein a section of said inner tubular wall (22B) decreases progressively from said annular wall (22A) up to said bottom wall (23).

22. The device according to claim 18, wherein radial connection elements or baffles are provided between said inner tubular wall (22B) and said peripheral wall (21).

23. The device according to claim 17, wherein said peripheral wall (21) has a passage section that decreases progressively, from a part of said single body (20) in which said flow regulating means (26) are arranged up to said annular wall (22A).

24. The device according to claim 17, wherein said peripheral wall (21) defines an internal diameter that increases progressively from said annular wall (22A) up to a part of said body (20) opposite to a part in which said flow regulating means (26) are arranged.

25. The device according to claim 17, wherein radial connection elements or baffles are provided between said bottom wall (23) and said peripheral wall (21).

26. The device according to claim 1, wherein said single body (20) is entirely obtained in a single piece of moulded thermoplastic material.

27. The device according to claim 1, wherein said outlet passages (28) are provided also for the purpose of filtering the fluid.

28. The device according to claim 1, characterized in that said outlet passages are provided on at least one side wall (22B) of said chamber (S).

29. A hydraulic valve having a respective body defining an inlet pipe (3), an outlet pipe (4), open/close means (13, 14) set operatively between said inlet pipe (3) and said outlet pipe (4), actuator means (7), which are operative for producing switching of said open/close means (13, 14), the valve further comprising, within at least one of said pipes (3, 4), a device for regulating and stabilizing a flow of a fluid (RF) built according to claim 1.

30. The valve according to claim 29, wherein, upstream of said device (RF), a filter (6) is present in said pipe (3).

31. A device for regulating and stabilizing a flow of a fluid, envisaged for insertion in a pipe for passage of the fluid (3), said device (RF) defining at least:
one inlet passage (SI), having a first section;
a section narrowing (22A) downstream of said inlet passage (SI), flow-regulating means (26) being provided in correspondence of said narrowing; and
supporting means (24, 25) for said flow-regulating means (26), in correspondence of said narrowing (22A); wherein said device (RF) further defines, downstream of said narrowing (22A) and said flow-regulating means (26), a chamber (S) having a cross section smaller than that of said inlet passage (SI), said chamber (S) having, at the longitudinal end thereof opposite to said flow-regulating means (26), a bottom wall (23),
said device (RF) comprises a single body (20), said inlet passage (SI) being defined by a wall (21) of said single body (20) which surrounds at least partly said flow-regulating means (26).
said chamber (S) is provided with a plurality of outlet passages (28) having a section smaller than that of said chamber (S) and with number of internal diaphragms (25A) dividing said chamber (S) into at least two sub-chambers.

32. The device according to claim 31 wherein said chamber (S) is divided, by means of two or more of said internal diaphragms (25A) into two or more sub-chambers, each internal diaphragm (25A) extending radially starting from said supporting means (24, 25).

33. The device according to claim 32, wherein said sub-chambers have an equal number of said outlet passages (28).

34. The device according to claim 32, wherein said sub-chambers have a different number of said outlet passages (28).

35. A hydraulic valve having a respective body defining an inlet pipe (3), an outlet pipe (4), open/close means (13, 14) set operatively between said inlet pipe (3) and said outlet pipe (4), actuator means (7), which are operative for producing switching of said open/close means (13, 14), the valve further comprising, within at least one of said pipes (3, 4), a device for regulating and stabilizing a flow of a fluid (RF) built according to claim 31.

36. A device for regulating and stabilizing a flow of a fluid, adapted for insertion in a pipe for passage of the fluid (3), said device (RF) defining at least:
one inlet passage (SI);
a section narrowing (22A) downstream of said inlet passage (SI), flow-regulating means (26) being provided in correspondence of said narrowing; and
supporting means (24, 25) for said flow-regulating means (26); wherein
said device (RF) further defines, downstream of said narrowing (22A) and said flow-regulating means (26), a chamber (S) delimited at the longitudinal end thereof opposite to said flow-regulating means (26) by a bottom wall (23),
said device (RF) comprises a single body (20) defining said narrowing (22A) and said chamber (S),
said chamber (S) is provided with a plurality of outlet passages (28) having a section smaller than that of said chamber (S) and with at least an internal diaphragm (25A) dividing said chamber (S) into at least two sub-chambers, each sub-chamber including at least one of said outlet passages (28).

* * * * *